Nov. 29, 1955     E. G. HASWELL     2,725,491
ADAPTER FOR ADJUSTABLY MOUNTING ANGLE SEARCH UNIT
ON CONTACT SHOE FOR ULTRASONIC SHEAR-WAVE
TESTING OF TUBULAR ARTICLES
Filed May 28, 1951     2 Sheets-Sheet 1
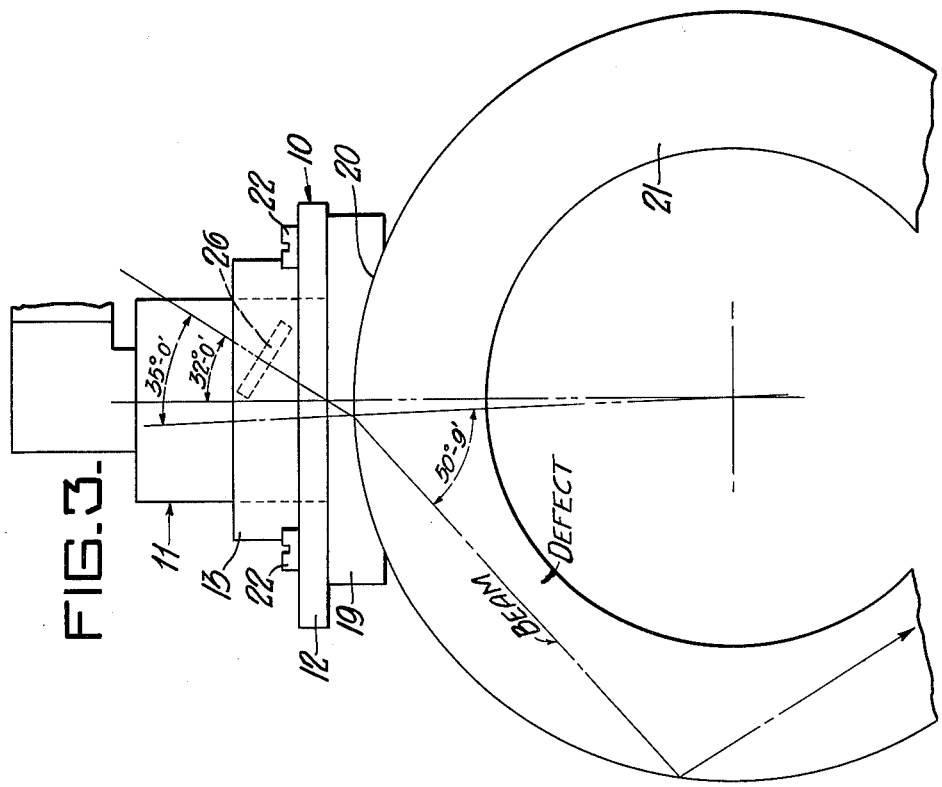
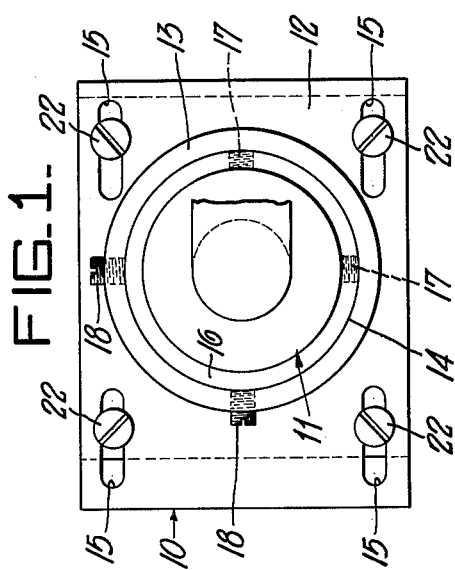
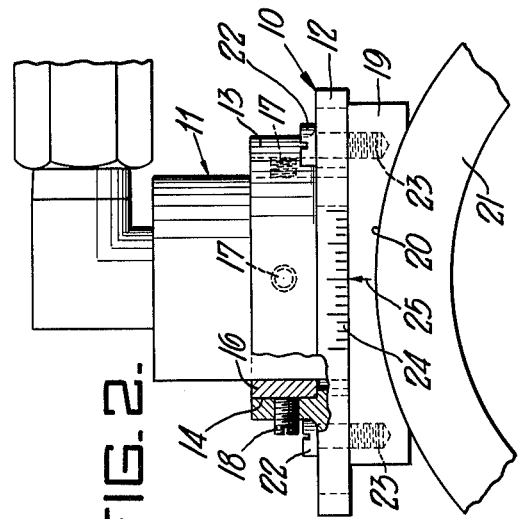
*Inventor:*
ERNEST G. HASWELL,
by: Donald G. Dalton
his Attorney.

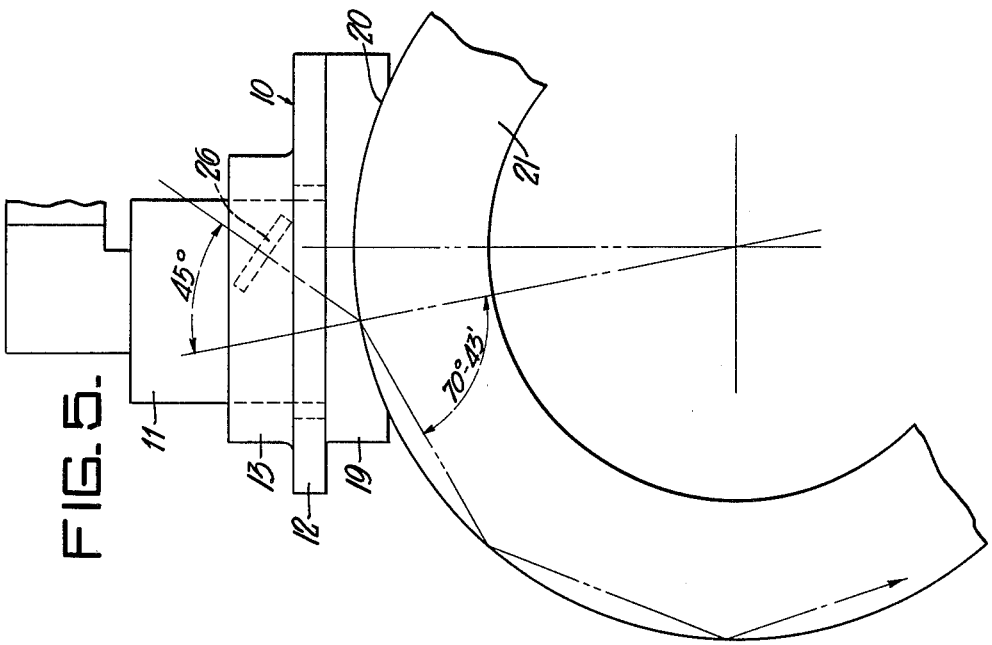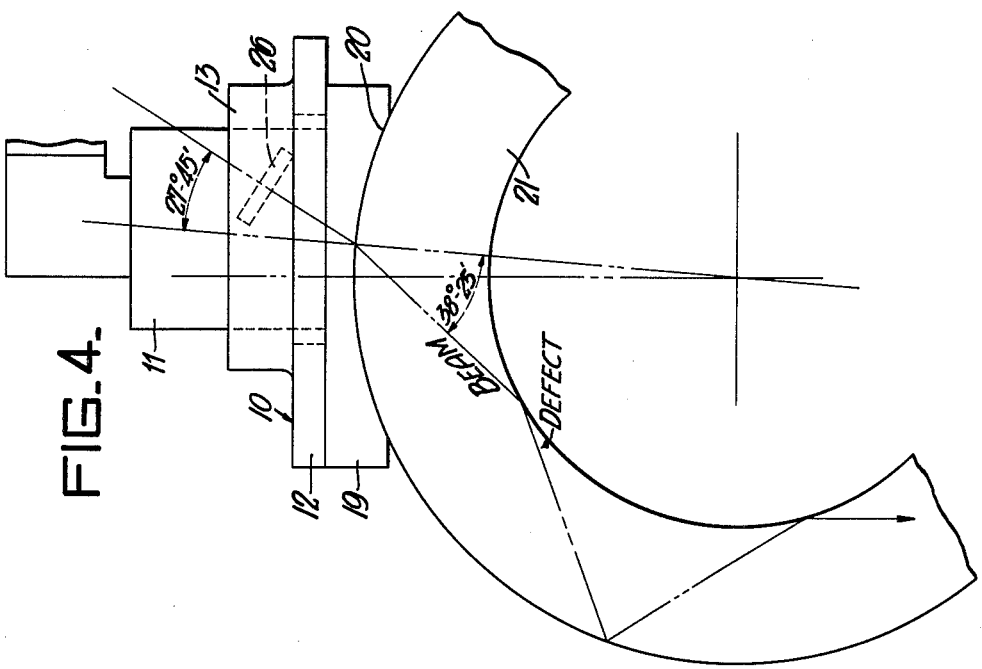

United States Patent Office 2,725,491
Patented Nov. 29, 1955

2,725,491

ADAPTER FOR ADJUSTABLY MOUNTING ANGLE SEARCH UNIT ON CONTACT SHOE FOR ULTRASONIC SHEAR-WAVE TESTING OF TUBULAR ARTICLES

Ernest G. Haswell, Ellwood City, Pa., assignor to United States Steel Corporation, a corporation of New Jersey Application May 28, 1951, Serial No. 228,564

2 Claims. (Cl. 310—8.7)

This invention relates to the testing of tubular articles for internal defects by ultrasonic vibrations or shear waves and, in particular, to an adapter for adjustably mounting the angle search unit used in that method of testing, on a contact shoe adapted to slide along and around the external surface of the article being tested.

The testing of metal articles for hidden defects by the repeated internal reflection of a beam of shear waves or vibrations of ultrasonic frequency has recently been developed to the point where it is practical for everyday use by manufacturers as a routine procedure. Apparatus therefor which is available commercially, produces pulses of ultrasonic vibrations and introduces them into the article under test at an oblique or right angle to the surface thereof by a search unit including a cup-shaped housing containing a quartz crystal. When the vibrations strike an internal crack, pocket or inclusion, or the far surface of the article, they are reflected back to the search unit. The crystal acting as an electro-acoustic transducer converts the reflected vibrations into electrical impulses which are amplified and fed to the screen of a cathode-ray tube producing a characteristic pattern. The method as applied to the testing of pipe is disclosed in a paper presented to the A. S. M. E. Power Division, September 1950, by C. D. Moriarty, entitled "Ultrasonic flaw detection in pipes by means of shear waves," published in A. S. M. E. Transactions, April 1951, vol. 73, No. 3, pp. 225–229. A commercial form of the contact shoe shown therein consists of a cylindrical cup of transparent synthetic plastic (methyl methacrylate resin) bored vertically from the top to receive the angle search unit with an exact fit and having a bottom which is precisely plane on the interior and curved on the exterior to fit accurately on the pipe to be tested.

This form of mounting is subject to several objections. When used on small tubes with thick walls, the beam of vibrations does not reveal defects adjacent the inner surface of the tube unless the axis of the housing of the search unit is offset from the radius of the curved exterior of the shoe parallel to such axis, and does not permit distinguishing between defects on the outside and those on the inside of the article. In addition, the cost of the cup is high because it must be machined from a solid block of material and because a close fit is required between it and the unit as well as the pipe, which necessitates a precision finish on both exterior and interior. A different shoe is required, of course, for each size of pipe to be tested, as well as for each size of search unit used of which there may be several. Thus a large number of mountings must be kept on hand, entailing quite a substantial outlay. In testing a pipe length it is necessary to move the shoe circumferentially thereof through an angle of approximately 120° (or to revolve the tube while holding the unit stationary) as well as to advance it along the tube from one end to the other. This causes rather rapid shoe wear, which increases the operating cost of this method of inspection, since the shoe must conform closely to the tube surface for accurate results.

I have invented an adapter which overcomes the foregoing objections. In a preferred embodiment, it comprises a flat base of metal having a boss integral therewith. A bore extends through the base and the boss, normal to the former and centrally of the latter. The base is secured on a shoe of any suitable material (one of which is transparent synthetic plastic) flat on top, so as to permit sliding adjustment of the base therealong, the bottom of the shoe being curved to fit the pipe. A bushing removably disposed in the bore is adapted to receive the search unit with a snug fit, a plurality of bushings being provided, one for each size of search unit available.

A complete understanding of the invention may be obtained from the following detailed description and explanation which refer to the accompanying drawings illustrating the present preferred embodiment. In the drawings, Figure 1 is a plan view;

Figure 2 is an elevation partly broken away, with parts in section; and

Figures 3, 4 and 5 are diagrammatic elevations showing the control of the beam of vibrations which is obtainable with my adapter.

Referring now in detail to the drawings and, for the present, to Figures 1 and 2, my adapter, indicated generally at 10, is shown in connection with an angle search unit 11 connected to an electrical system (not shown) for generating ultrasonic vibrations and responding to reflections thereof from the article being tested. The search unit is of the type shown in Figure 2 of Moriarty's paper mentioned above. The adapter includes a base block 12 having a boss 13 upstanding thereon. The adapter is preferably of metal, e. g., brass. The base is flat on its lower surface and a bore 14 extends through the boss and base normal to such surface. The base has four parallel slots 15 therein, two adjacent each end, for a purpose which will appear shortly. A bushing 16 dimensioned to fit snugly in bore 14 has an opening therethrough in which the search unit has a close fit. Headless set screws 17 secure the bushing to the unit and set screws 18 secure the bushing in the bore in boss 13.

A contact shoe 19 of any material having proper vibration-transmission characteristics, preferably of transparent synthetic plastic such as methyl methacrylate resin, is flat on top and has its bottom shaped as at 20 to fit accurately on the surface of the article to be tested. In the illustrated embodiment, the article is a pipe length 21 and the bottom of the shoe is curved to the radius of the pipe whereby it has contact therewith over an extended area as the shoe is moved along and around the pipe. The shoe is secured to the adapter with the top of the former in direct contact with the bottom of the latter, by screws 22 inserted through slots 15 and threaded into tapped holes 23 in the shoe. By virtue of slots 15, the adapter may be slidably adjusted along the shoe when screws 22 are backed off slightly. A series of graduations 24 on one edge of the adapter cooperates with an index pointer 25 on the shoe to show the setting of the former relative to the latter at all times.

When the unit 11 is positioned in boss 13 and shoe 19 is secured to the bottom of the base, with the bottom of the unit in direct contact with the top of the shoe, vibrations generated in the unit are projected by internal reflection around the periphery of the pipe, at an angle to the radius of the surface 20 through the center of the unit which depends on the position of the adapter lengthwise of the shoe. The unit also serves to pick up the reflection of the beam of vibrations and means responsive thereto indicates the presence of a defect by the character of the reflected beam. This will be further explained by reference to Figures 3 through 5, showing arrangements suitable for testing steel pipe with a contact shoe of transparent synthetic resin, having given indices of refraction therebetween of about .750.

It should be understood that the ultrasonic wave train is actually a diverging beam of shape and dimensions determined by the design of the search unit. However, in order to facilitate explanation of its characteristics, it is convenient to consider a line representing the center of the wave train, which is also the path of maximum energy. When the wave train strikes the metal surface, it is converted into longitudinal and shear waves, the mechanism of which is described in the literature. Due to the fact that the velocity of the longitudinal waves is approximately twice that of the shear waves, within a range of incident angles, the longitudinal waves are wholly reflected from the metal surface while the shear waves are refracted and transmitted through the metal. This range of incident angles depends on the material being tested, the composition of the contacting shoe, and the nature of the oil or other film maintained between the contacting surfaces. For the combination of synthetic resin and steel, the range of usable incident angles is approximately 26° to 58°. If the incident angle is greater than 58°, both the longitudinal and shear waves would be totally reflected, and none would be refracted into the steel; if less than 26°, both types of wave would enter the steel with consequent interference.

The commercially available angle search unit is designed to produce an incident angle of 32°, which results in total reflection of the longitudinal wave and refracts the shear wave at an angle of approximately 45°. In testing tubular material, such a refracted angle places a limitation on the wall thickness/diameter ratio beyond which defects located near the inside surface cannot be detected. In testing light-walled tubing, furthermore, a fixed incident angle of, say 32°, would result in lower sensitivity of the instrument than a greater angle, since the former would require more internal reflections of the wave train by the tube surfaces with accompanying attenuation of the train at each reflection.

Some license has been taken in statements concerning incident and refractive angles in the discussion of Figures 3 through 5. This has been done through selection of an arbitrary index of refraction between resin and steel based on an approximation. While this index of refraction varies with composition of the contacting shoe and composition, microstructure, etc., of the material being tested, in any event, the incident and refractive angles would bear a definite relationship to each other of the order shown in the drawings.

The search unit may be secured to the adapter in different positions relative thereto by means of the screws 22 in the slots 15 in the adapter 10. The effect of this adjustment is shown in Figures 3, 4 and 5. In the drawings, no refraction is shown between the search unit and the contacting shoe, since they are presently made from the same material. In Figure 3, the shoe is centered relative to the search unit. In this case, due to the thickness of the shoe, the beam of vibrations from a piezo-electric crystal 26 strikes the outer surface of the pipe 21 slightly to the left of the vertical radius and makes an angle of 35° with the pipe at the point of contact, rather than the 32° design angle. Entering the tube, the beam is refracted to an angle of 50° 9' with this radius. With the beam entering at this angle, defects originating at the outer surface of the pipe will be shown up as the unit is moved around the tube, but defects originating at the inner surface will be missed, as indicated in the drawing.

Figure 4 shows the adapter shifted to the right. In this case the beam meets the radius of the tube at an angle of 27° 45' and enters the metal at an angle of 38° 25'. When the unit is moved around the tube it will show up internal defects as well as external. The sensitivity for external defects will be comparable to that for internal ones, but somewhat less than in the setting shown in Figure 3.

By reversing the shoe and adapter in respect to the search unit, from the relation shown in Figure 4, the resulting offsetting of the adapter results in incident angles greater than 35°, as shown in Figure 5. Such a setting minimizes attenuation of the beam in testing thin-walled tubing by shortening the path of travel and reducing the number of internal reflections. It facilitates in testing heavy-walled material, since a defect near the inside surface would be detected with the procedure illustrated in Figure 4, but not with the procedure illustrated in Figure 5, while a defect originating at the outside surface would be detected by both. It is thus possible to distinguish between internal and external defects.

It will be apparent from the foregoing that, in carrying out the method of testing made possible by my improved adapter, I place the shoe with the search unit and adapter attached, on the exterior of a pipe length. With the unit excited, I slide the shoe along and around the pipe and observe the reflected beam, if any, on the cathode-ray tube. I then change the adjustment of the shoe on the adapter and repeat the test. Altering the position of the shoe on the adapter changes the angle of incidence of the beam as just explained.

The adapter adjustment described thus enables the search unit to reveal internal defects which will not register on standard equipment and also to increase the sensitivity in selected areas as desired. This permits faster and more accurate location of defects. My invention also makes possible appreciable economies in the cost of the shoes. The boring operation is entirely eliminated and it is only necessary to machine the lower face to fit the tube curvature. The plastic plate as furnished by the supplier has a smooth and accurate plane surface which eliminates the necessity for machining the upper surface of the shoe.

It will be apparent from the foregoing that the adapter of my invention is possessed of important advantages. In the first place, the provision for adjustment of the adapter along the shoe permits a much more thorough testing of pipe than has been possible heretofore, as just explained. The ability to show up defects on the interior as well as the exterior of heavy-wall pipe makes it possible to distinguish between these types of defects and locate them more accurately. In the second place, the ability to use, for making the contact shoe, a flat plate of synthetic plastic having an accurately finished top surface as purchased, greatly reduces the time and labor involved, as well as the amount of material, and correspondingly affects the overall cost of testing. The provision of a set of bushings 16, one for each size of search unit used, avoids the necessity of a separate shoe for each.

Although I have disclosed herein the preferred embodiment of my invention, I intend to cover as well any change or modification therein which may be made without departing from the spirit and scope of the invention.

By the term "search unit" as used in the appended claims, I mean a piezo-electric crystal mounted in a cup-shaped housing with the face of the crystal at an oblique angle to the axis of the housing.

I claim:

1. In apparatus for the vibration testing of metal articles, said apparatus including a cylindrical housing enclosing a piezo-electric crystal, the combination therewith of a shoe plate having a flat top and a bottom adapted to contact a surface of said articles and shaped to conform closely thereto, an adapter block having a cylindrical cup upstanding thereon and a generally flat bottom slidably seated on the top of said shoe plate, means guiding rectilinear sliding movement of said block on said shoe plate, and means removably securing said housing in said cup, the bottom of said plate being a cylindrical segment with its axis normal to the direction of said sliding movement.

2. Apparatus according to claim 1 characterized by said guiding means comprising a plurality of pin-and-slot connections between the shoe plate and adapter block.

References Cited in the file of this patent

UNITED STATES PATENTS

| | | |
|---|---|---|
| 220,153 | Judd | Sept. 30, 1879 |
| 2,264,553 | Robinson et al. | Dec. 2, 1941 |
| 2,527,986 | Carlin | Oct. 31, 1950 |
| 2,602,101 | Mesh | July 1, 1952 |

FOREIGN PATENTS

| | | |
|---|---|---|
| 14,548 (1910) | Great Britain | June 1, 1911 |
| 615,684 | Great Britain | Jan. 10, 1949 |

OTHER REFERENCES

A. S. M. E. Transactions, April 1951, vol. 73, No. 3, pages 225–229, by Moriarty.